United States Patent Office 3,266,158
Patented August 16, 1966

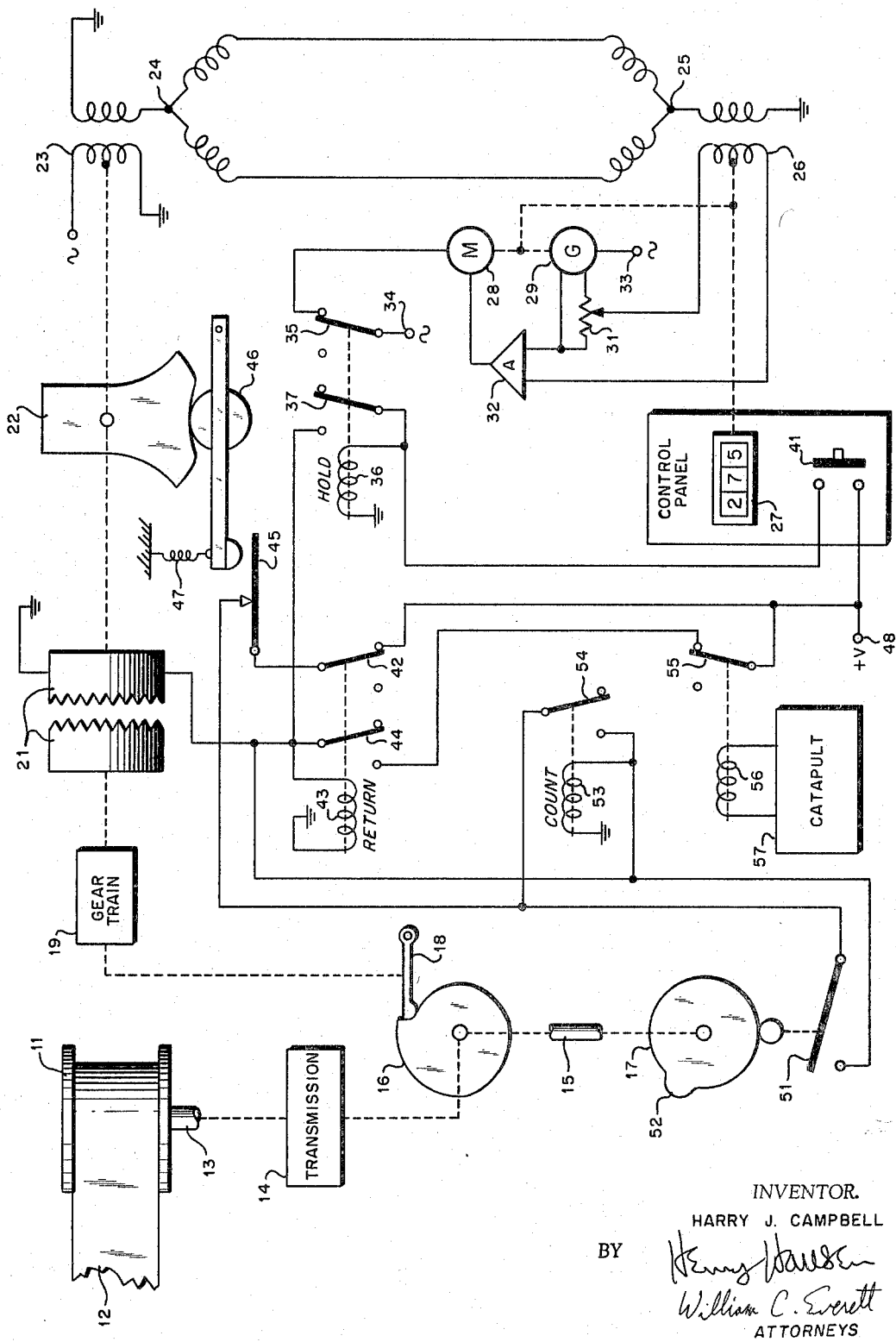

3,266,158
RUNOUT DISTANCE COUNTER FOR
CATAPULT BRIDLE ARRESTER
Harry J. Campbell, Doylestown, Pa., assignor to the
United States of America as represented by the
Secretary of the Navy
Filed Dec. 3, 1964, Ser. No. 415,833
10 Claims. (Cl. 33—139)

The invention described herein may be manufactured and used by or for the Government of the United States of America for governmental purposes without the payment of any royalties thereon or therefor.

The present invention relates to a distance indicating mechanism for an object which is discharged to run out for a short distance, such as the catapult bridle arrester in an aircraft catapult system, and more particularly to a distance indicating mechanism for a catapult bridle arrester which maintains the distance readout figure on the indicator until the catapult is prepared for the next shot.

In the field of catapults it has been the general practice to paint stripes on the deck of the carrier at 2 foot intervals across the bridle arrester shuttle track, starting with zero at the brake application location. After each catapult shot a sailor must run out to the track and note the distance traveled by the bridle arrester shuttle. This distance being measured as closely as he can estimate from the deck stripes, the sailor must then return to the deck edge and relay this information by phone to the control crew. The control crew in turn takes his distance figure and adds the length of the bridle used to get the proper total run-out figure. This practice requires the use of man power, is time consuming and on occasion can be dangerous to the sailor who must run out and look at the equipment.

The general purpose of this invention is to provide a readout system which provides an indication to the control crew of the distance of the run out of the bridle arrester, which indication can be held on the counter until the catapult is ready for the next shot, and thereafter automatically returns to zero in preparation for the next shot. To attain this, the present invention contemplates a cam rise and cam follower attached to a conversion cam which rotates proportionally to the shaft of a tape drum attached to the bridle arrester. The rotation of the cam follower is translated through appropriate gear and clutch mechanisms and an electrical synchro transformer system into a readout which is expressed on a counter on the control panel. The cam rise actuates a relay, indicating the zero reference point, which engages a clutch mechanism to begin the rotation of the counter in response to the rotation of the cam follower. A push button is provided which operates a set of relays which operate to hold the figure on the counter until such time as the catapult is ready for another shot. When the catapult is readied, it actuates a ready pulse relay which resets the counter mechanism, the clutch mechanism and the synchro transformers to zero in preparation for the next shot.

Accordingly, it is an object of the present invention to provide a distance run-out measuring device to indicate automatically at a control location the run-out distance of a discharged object.

Another object is to provide means for holding the count on the counter until the object is prepared for the next shot.

A further object of the invention is to provide means for returning the counter to zero automatically in preparation for the next shot and for re-arming the mechanism to begin the count again.

Still another object of the invention is to provide means for adjusting the mechanism automatically for a broken tape to indicate a new zero reference point on the drum rotation.

Other objects and many of the attendant advantages of this invention will be readily appreciated as the same becomes better understood by reference to the following detailed description when considered in connection with the accompanying drawing wherein:

The figure shows a schematic diagram of the system according to the invention.

In the figure there is shown a tape drum 11 carrying tape 12 which is connected to the catapult bridle arrester, not shown, mounted on a shaft 13 which in turn is connected to a transmission 14 having a set reduction ratio. Transmission 14 reduces the degree of turn and controls the rotation of a second shaft 15 on which are mounted a conversion cam 16 and cam rise 17. Conversion cam 16 has riding on it a cam follower arm 18 which is linked to gear train 19. The reduction in transmission 14 is such that one complete rotation of conversion cam 16 will completely pay out all of the tape on drum 11, so that conversion cam 16 never rotates through more than one complete revolution.

Gear train 19 is in turn connected through a clutch mechanism 21 to a centering mechanism 22 and a synchro transmitter arm 23. Synchro transmitter arm 23 is rotatable and is connected to a source of A.C. current. In opposition to synchro transmitter arm 23 is a three arm synchro transmitter stator 24 one arm of which is connected to ground and the other two arms of which are connected to two arms of a three-arm follow-up synchro stator 25. In opposition to stator 25 is follow-up synchro arm 26 rotatable on a common shaft with a counter 27, a motor 28 and a generator 29.

Arm 26 is also linked electrically between a trim pot 31 which extends across generator 29 and an amplifier 32 which is also connected to one side of trim pot 31. Generator 29 is connected to an A.C. source 33. Motor 28 is connected to another A.C. source 34 through the arm 35 of a hold relay 36 which also controls a second relay arm 37. Relay arms 35 and 37 are shown in the unenergized position of hold relay 36.

Hold relay 36 is connected to one side of a push button 41, the other side of which is connected to a voltage source. The voltage source is also connected to one side of another relay arm 42. Relay arm 42 is controlled by a return relay 43 which also controls another relay arm 44. The other side of relay arm 42 is linked to a switch 45 which is opened by a cam follower arm 46 controlled by centering mechanism 22. Cam follower arm 46 is held up by a spring 47.

Relay arm 42 is connected by switch 45 to another switch 51 which is normally open but may be closed by a rise portion 52 on cam rise 17. The other side of switch 51 is linked to a count relay 53 which controls a relay arm 54 which is linked back to the opposite side of switch 51. Voltage source 48 is also connected through a relay arm 55 to one side of relay arm 44. Relay arm 55 is controlled by a relay 56 energized by a connection 57 with the catapult, not shown.

The operation of the device is as follows: at the beginning of the operation all relays are de-energized. When the catapult is ready for launch, relay 56 is momentarily energized which opens relay arm 55 momentarily. Immediately upon firing of the catapult, relay 56 is de-energized again allowing closure of relay arm 55. At a zero reference position of the tape which is quite near the beginning of the tape pull-out, cam rise portion 52 of cam rise 17 contacts switch 51 closing it momentarily. The effect of this is to energize counter relay 53 from voltage source 48 through relay arm 42 and switch 45. When counter relay 53 is energized, relay arm 54 is closed, thereby providing a permanent connection between voltage source 48 and relay 53, and relay arm 54 is thereafter held closed. When switch 51 closes and relay arm 54 of count relay 53 closes, the clutch 21 also is energized, which thereupon connects the rotation of cam follower arm 18 through gear train 19 and clutch 21 to synchro transmitter arm 23. By means of stators 24 and 25 and the feedback system consisting of motor 28, generator 29, trim pot 31, and amplifier 32, the position of arm 26 will be rotated to coincide with the rotation of synchro transmitter arm 23. This will turn counter 27 to indicate the degree of rotation of cam follower 18 and therefore indirectly the tape payed out of drum 11. When the tape is payed out as far as it is going to go on the shot the operator may press push button 41 connecting voltage source 48 with hold relay 36. When relay 36 is energized, relay arm 35 is disconnected cutting off voltage source 34 from motor 28. Relay arm 37 is then connected, connecting voltage source 48 with return relay 43 thereby switching relay arms 42 and 44. Closing relay arm 44 connects both relays 43 and 36 with voltage source 48 through relay arm 55 thereby holding both relays energized. By the same means the connection to count relay 53 is broken by opening relay arm 42. This opens relay arm 54 and de-energizes relay 53. The effect of this is to de-energize clutch 21 which then stays open until re-energized. Since voltage source 34 is cut off from motor 28 the feedback system will no longer respond to changes of current in arm 26. Meanwhile the centering mechanism 22 actuated by spring 47 and cam follower arm 46 will cause the right side of the clutch and follow-up synchro arm 23 to return to the center position. However, since motor 28 is disconnected this will not cause counter 27 to return to zero. The entire system stays in this position until the catapult is readied for the next shot.

When the catapult is readied for the next shot, catapult connection 57 briefly energizes relay 56, the effect of which is to open relay arm 55. The effect of this is to disconnect voltage source 48 from relays 43 and 36 and both of them are de-energized and relay arms 42, 44, 35 and 37 return to their normal positions. This reconnects voltage source 34 through relay arm 35 to motor 28. Follow-up synchro arm 26 will now respond to the zero position of arm 23 to return the counter to zero. As soon as the catapult is fired, relay 56 is de-energized closing again relay arm 55 and the cycle repeats as before.

Centering mechanism 22, besides returning the mechanism to zero at the end of a shot, provides a limit switch. If centering mechanism 22 rotates more than approximately 90 degrees, cam follower arm 46 will open switch 45. This opens relay 53 returning the mechanism automatically to zero in preparation for the next shot, and indicating that the tape has payed out too far. Since this only occurs when there is a serious malfunction in the bridle arrester, as when the shuttle continues to the end of the track, switch 45 will not be opened in ordinary operation, and the opening of switch 45 is a signal for a serious malfunction.

In the event that tape 12 should break, as sometimes occurs during the catapult shot, the end of the tape may be reconnected where broken off to the bridle arrester. Then cam rise 17 may be loosened on shaft 15, rotated to a new zero reference position and retightened. This automatically reestablishes the zero reference point whereupon switch 51 will again be closed by rise portion 52 at the point where the tape passes the zero reference point on the deck. The shape of conversion cam 16 is such that the rotation of follower arm 18 is proportional to the amount of tape payed out regardless of whether there is a lot or a little tape on the drum. To accomplish this, the shape of the conversion cam must follow the formula $r = a + (R\theta - R^2\theta^2/4\pi)ntd$ where $r$ is the radius of the cam at any given $\theta$, $\theta$ is the angle around the cam from the lowest point (not more than $2\pi n/R$), $n$ is the number of turns of material on the drum when fully wound, $t$ is the thickness of the material, $R$ is the reduction ratio of transmission 14 (around 90 in a typical example), and $d$ is an arbitrary proportionality constant. The ratio of gear train 19 is generally adjusted so that synchro arm 23 rotates about 1° per foot of tape payed out. This automatically compensates for the change of proportion of linear tape fed out to degrees rotation as the radius of the tape on the drum decreases. This is possible since one complete rotation of conversion cam 16 is more than the maximum length of tape which can be held on tape drum 11.

It will be seen by the foregoing description that the system automatically measures the length of tape payed out and automatically resets the equipment by a push button before the next shot. Further, the equipment provides for the contingency of serious malfunction in which the bridle shuttle continues all the way to the end of the track. Moreover, the equipment automatically compensates for a broken tape and a change of radius of tape on the tape drum.

If desired the operations of the relays may be accomplished instead by digital logic gates and appropriate digital logic circuits may be substituted for the synchro transmitter and follow-up synchro arms.

Obviously many modifications and variations of the present invention are possible in the light of the above teachings. It is therefore to be understood that within the scope of the appended claims the invention may be practiced otherwise than as specifically described.

What is claimed is:

1. A run out distance indicator for a rapidly discharged object comprising:
    a length of material one end of which is attached to said object;
    a drum attached to the other end of said material for rolling up and storing said material when not extended, said drum adapted to pay out said material upon discharging said object;
    a counter having a readable dial adapted to rotate in proportion to the rotation of said drum;
    a connecting means between said drum and said dial adapted to connect said dial and said drum when engaged; and
    switching means actuated by a predetermined reference position of said drum to engage said connecting means.

2. A run out distance indicator for a rapidly discharged object comprising:
    a length of material, one end of which is attached to said object;
    a drum attached to the other end of said material for rolling up and storing said material when not extended, said drum adapted to pay out said material upon discharging said object;
    a counter having a readable dial adapted to rotate in proportion to the rotation of said drum;
    a connection means between said drum and said dial adapted to connect said dial and said drum when engaged;
    a cam rise;
    a switch closed by said cam rise at a predetermined reference position of said drum; and
    a counter relay closed upon closure of said switch, thereafter remaining closed, said relay causing engagement of said connecting means.

3. A run out distance indicator as recited in claim 2 further comprising:
    a return relay operable when closed to open said count relay and disconnect said counter; and
    means to close said return relay.

4. A run out distance indicator as recited in claim 3 further comprising:
- a hold relay operable when closed to hold itself closed and to close said return relay; and
- means to close said hold relay.

5. A run out distance indicator as recited in claim 4 wherein said means to close said hold relay comprises a push button providing a momentary impulse to close said hold relay.

6. A run out distance indicator as recited in claim 5 further comprising:
- a means responsive to a condition of said object ready for discharging to open said hold and return relays.

7. A run out distance indicator as recited in claim 2 further comprising:
- a transmission connected to said drum having a reduction ratio;
- a conversion cam connected to said transmission, the reduction ratio being such that said conversion cam rotates less than one complete revolution for the longest length of material storable on said drum, said cam rise being coaxial with said conversion cam; and
- a cam follower arm following said cam and linked rotatably to said connecting means.

8. A distance run out indicator as recited in claim 7 wherein said cam rise is rotatably adjustable with respect to said conversion cam.

9. A run out distance indicator as recited in claim 7 wherein said conversion cam is shaped such that rotation of said follower arm is proportional to the length of material payed out.

10. A distance run out indicator as recited in claim 3 further comprising:
- a synchro transmitter arm connected to said connecting means when said connecting means is engaged;
- a synchro transmitter stator associated with said synchro arm;
- a follow-up synchro stator linked electrically to said synchro transmitter stator;
- a follow-up synchro arm associated with said follow-up synchro stator, said counter being linked to said follow-up synchro arm; and
- a feedback means adapted to cause said follow-up synchro arm to take the same position with respect to said follow-up stator as said synchro transmitter arm to said synchro stator, whereby said means to disconnect said counter disconnects said feedback means.

References Cited by the Examiner

UNITED STATES PATENTS

| | | | |
|---|---|---|---|
| 3,020,005 | 2/1962 | Stockwell | 244—63 |
| 3,170,240 | 2/1965 | Collins | 33—140 |

References Cited by the Applicant

UNITED STATES PATENTS 2,703,211  3/1955  Hinchman et al.

ROBERT B. HULL, *Primary Examiner.*

ISAAC LISANN, *Examiner.*

B. DONAHUE, *Assistant Examiner.*